Nov. 10, 1931.   V. GUINZBURG   1,830,791
EXTENSIBLE BAND
Filed Feb. 26, 1931
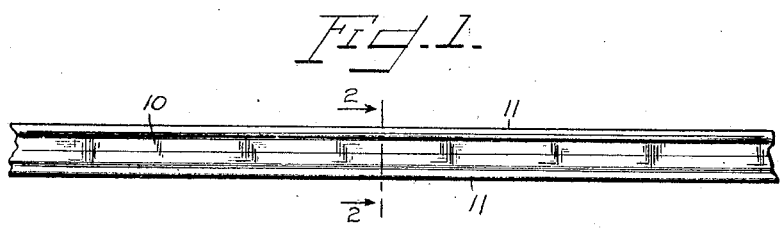
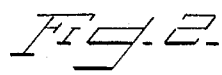
Victor Guinzburg
INVENTOR
BY
ATTORNEY Patented Nov. 10, 1931

1,830,791

UNITED STATES PATENT OFFICE

VICTOR GUINZBURG, OF NEW YORK, N. Y., ASSIGNOR TO I. B. KLEINERT RUBBER COMPANY, OF NEW YORK, N. Y.

EXTENSIBLE BAND

Application filed February 26, 1931. Serial No. 518,443.

My invention relates to extensible bands and has reference particularly to improvements in the construction of an all rubber band to be used in the same capacity as that for which the well known elastic webbing is employed.

This invention is a further development of my improved extensible waist band or belting described in my co-pending application filed December 7, 1928, Serial No. 324,429.

The present invention has for its object to provide an all rubber elastic band or belt for garments and sanitary supporters, which will have all of the elastic properties of regular elastic webbing and rubberized fabrics without the added cost of the fabric, and which is constructed with rolled or tubular edges for the purpose of affording greater ease for the wearer.

One embodiment of my invention is illustratively exemplified in the accompanying drawings, in which Figure 1 is an elevational view of a strip of rubber belting constructed in accordance with my invention; and Figure 2 is a substantially transverse sectional view taken on lines 2—2 of Figure 1.

Referring to the drawings, the band or belting comprises a strip of raw unvulcanized rubber having its opposite longitudinal sides folded over on the mid portion to a position where the sides abut each other. The double layer of rubber is then subjected to treatment which causes the mid portion between the folds to closely adhere together and which further includes a vulcanizing stage.

The result is a strip of material having a transverse section of the shape illustratively exemplified in Figure 2, comprising a two ply mid portion 10 and marginal tubular portions 11. The rolled tubular sides 11 remain open throughout the life of the band and not only add materially to the strength of the latter, but afford the soft pliable edges so greatly desired where they are actually brought into contact with the delicate skin of the wearer, e. g. in the body bands of sanitary belts. These tubular edges are virtually inflated cushions because any air which may have become pocketed in the folds would have a tendency to offer just enough resistance to the collapse of the edge to give it a comfortable feeling when brought into contact with the wearer's body.

It will be understood that the bands or belts constructed in accordance with the present invention may be of any suitable dimensions or weight of rubber material without departing from the spirit of the invention.

What I claim and desire to secure by Letters Patent is:

1. As an article of manufacture, a continuous strip of all rubber material folded longitudinally thereof, the folds forming soft unfilled tubular portions along opposite longitudinal sides, the two layers of rubber at the longitudinal mid portion being integrally adhered together.

2. As an article of manufacture, a continuous strip of all rubber material folded along two lines longitudinally thereof, the folds forming soft unfilled tubular portions along opposite longitudinal sides, the sides of the original strip abutting each other in the longitudinal mid portion and together with the two layers forming the latter are integrally adhered together.

3. As an article of manufacture, a continuous strip of all rubber material folded longitudinally thereof, the fold forming a soft unfilled tubular portion along the side, the mid portion beyond the fold consisting of two layers of the rubber adhered together.

In testimony whereof he has affixed his signature.

VICTOR GUINZBURG.